Aug. 11, 1959     N. L. PETERSON     2,899,607
CONTROL SYSTEM FOR THREE PHASE BRIDGE RECTIFIER CIRCUITS
Filed Nov. 28, 1955     2 Sheets-Sheet 1

Inventor
Norman L. Peterson
By H. R. Rather
Attorney

Aug. 11, 1959     N. L. PETERSON     2,899,607
CONTROL SYSTEM FOR THREE PHASE BRIDGE RECTIFIER CIRCUITS
Filed Nov. 28, 1955     2 Sheets-Sheet 2
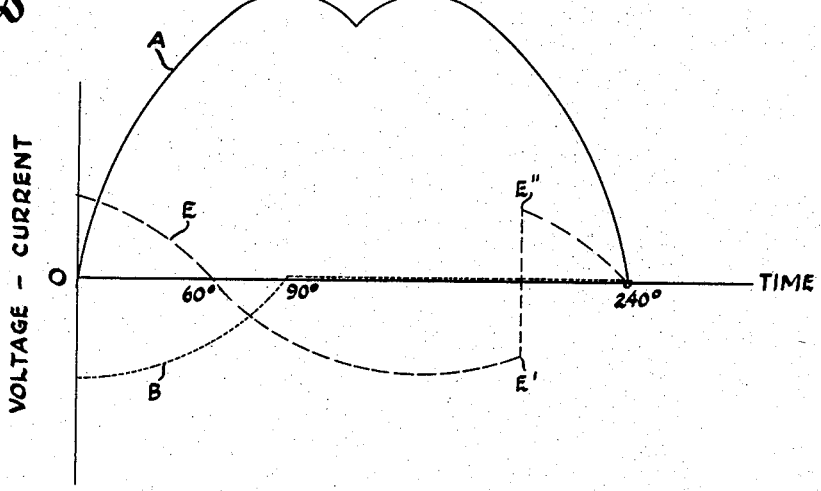
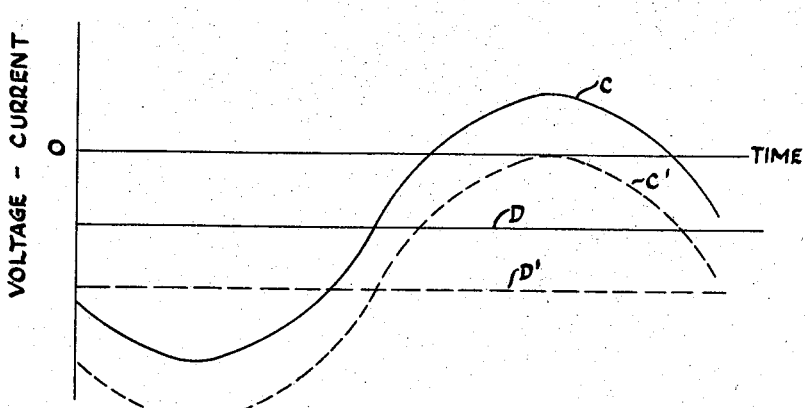
Inventor
Norman L. Peterson
By H. R. Rather
Attorney United States Patent Office 2,899,607
Patented Aug. 11, 1959

2,899,607

CONTROL SYSTEM FOR THREE PHASE BRIDGE RECTIFIER CIRCUITS

Norman L. Peterson, Wauwatosa, Wis., assignor to Cutler-Hammer, Inc., Milwaukee, Wis., a corporation of Delaware Application November 28, 1955, Serial No. 549,277

5 Claims. (Cl. 315—195)

This invention relates to a three phase bridge rectifier circuit and more particularly to an improved system for controlling the conduction of main supply tubes in such circuits.

The use of three phase bridge rectifier circuits for controlling current to load devices from three phase alternating current sources of supply is of course well known. When such circuits are to have high output, or the sources of voltage supply are of relatively low frequency, the use of anode transformers to change the plate voltage of the main supply tubes becomes prohibitively expensive.

Accordingly it is a primary object of the present invention to provide a three phase bridge rectifier circuit in which the need for use of such anode transformers is dispensed with through use of a novel and improved form of firing control system for the main supply tubes.

Control of the main supply tubes in such a bridge rectifier circuit is somewhat complicated because the anode potentials to which the tubes are subjected are not of a simple sinusoidal form and are positive for 240° during each cycle. With my improved control system, the firing of these tubes can be obtained at any point during the last 180° of the conducting portion of the cycles of the tubes, which is a sufficient range of control for most practical applications. However, to afford this range of control it is necessary that conduction of the tubes be prevented during the first 60° of the conducting portion of their cycles.

In carrying out my invention I subject the control grids of each main supply tube to a half-wave rectified alternating bias potential which is negative with respect to the cathode potential during the first 90° of the conducting portion of the cycles. I also subject each of the control grids to an alternating potential which is positive during the first 60° of the conducting portion of its associated tube, and which is thereafter normally negative during the remainder of the tube conducting period. The instantaneous magnitudes of the first mentioned half-wave rectified alternating bias potentials are sufficient during the first 60° to prevent the last mentioned alternating potentials from firing the tubes. However, I provide a phase shift circuit under the control of a pilot tube which provides for instantaneous 180° reversal in the phase of said last mentioned alternating potentials at any selected time during the last 180° of the conducting periods of the main supply tubes. Control of firing of the pilot tubes in the phase shift circuits is obtained through the medium of a unidirectional control potential and superimposed alternating potentials which in certain applications are varied in time phase by variation in magnitude of the unidirectional potential.

Other objects and advantages of my invention will hereinafter appear.

The accompanying drawings illustrate a preferred embodiment of the invention which will now be described, it being understood that the embodiment illustrated is susceptible of modification in respect of details without departing from the scope of the appended claims.

Fig. 2 shows the relationship of certain voltages in conjunction with the control of the main supply tubes of the bridge circuit, and Fig. 3 shows the relationship of certain other voltage in conjunction with the control of pilot tubes.

Figure 1:
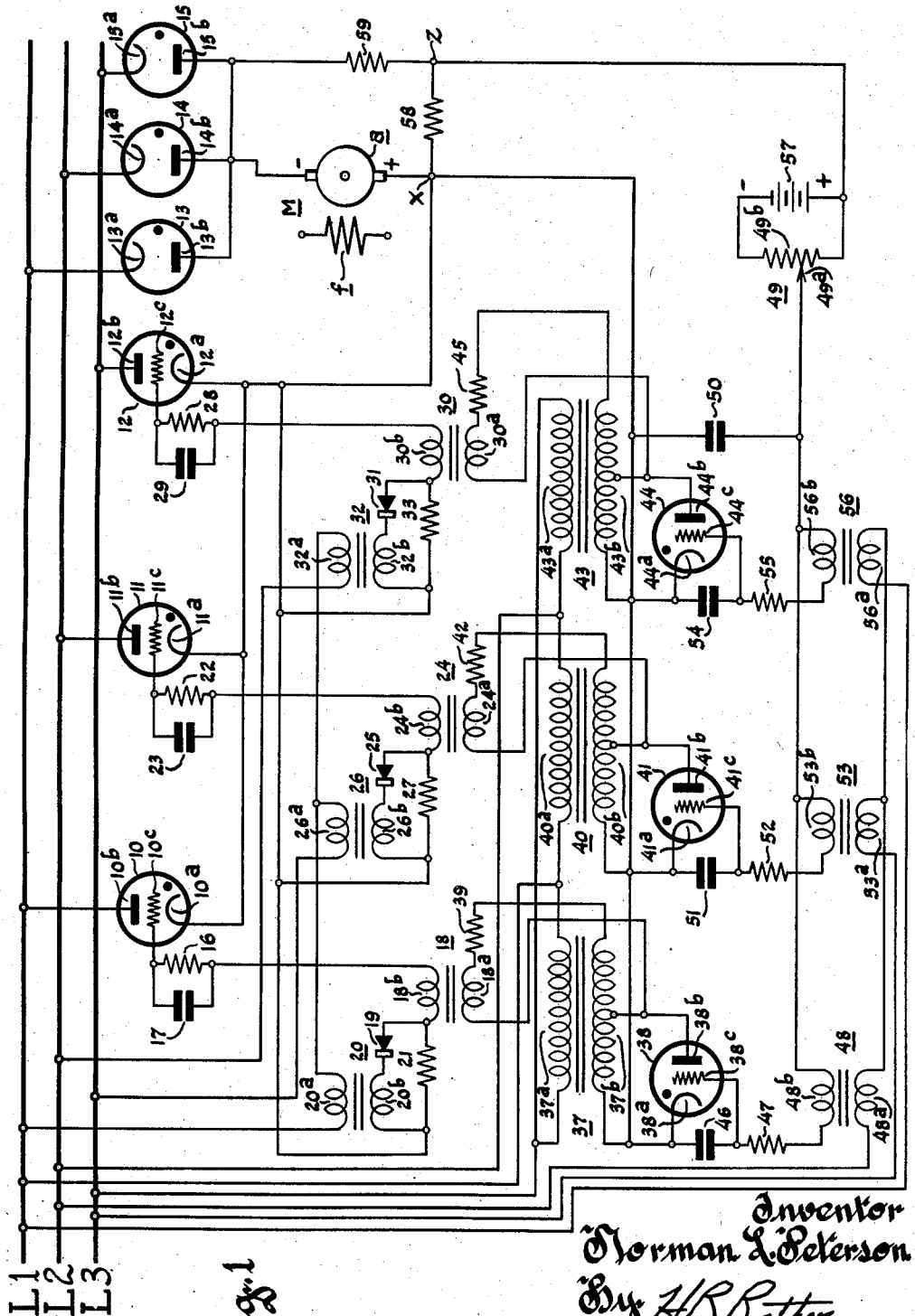
Figure 1 is a diagrammatic showing of a three phase bridge circuit incorporating the invention as applied to use with the armature of direct current motor.

Referring to Fig. 1, it shows a D.C. motor M having an armature $a$ and a shunt field winding $f$. Field winding $f$ may be assumed to be supplied from any suitable source of D.C. supply. At one end armature $a$ is connected to the cathodes $10^a$, $11^a$ and $12^a$ of gaseous type main supply tubes 10, 11 and 12, respectively, and at its other end armature $a$ is connected to anodes $13^b$, $14^b$ and $15^b$ of gaseous diode tubes 13, 14 and 15, respectively. The latter tubes have their cathodes $13^a$, $14^a$ and $15^a$ connected to lines L1, L2 and L3, respectively, of a three phase source of A.C. supply, and tubes 10, 11 and 12 have their anodes $10^b$, $11^b$ and $12^b$ connected to lines L1, L2 and L3, respectively. Tubes 10, 11 and 12 also have control electrodes $10^c$, $11^c$ and $12^c$, respectively, through the medium of which firing of the tubes is controlled as will be hereinafter more fully explained.

It will be apparent that the aforedescribed connections of armature $a$ with main tubes 10 to 12 and diode tubes 13 to 15 is a well known three phase bridge rectifier circuit. In such a circuit the voltage applied across the anode-cathode circuit of each of the tubes 10 to 12 is not a simple sinusoid and is positive for 240° during each cycle; the curve A in Fig. 2 depicting such typical voltage relationship for each of the main supply tubes. The portion of the system now to be described pertains to control of firing of tubes 10 to 12.

Control grid $10^c$ of tube 10 is connected in through the parallel connected resistor 16 and capacitor 17, in series with a secondary winding $18^b$ of a transformer 18, and either in series with a half-wave rectifier 19 and the secondary winding $20^b$ of a transformer 20, or in series with a resistor 21 to the point X common between the cathodes of tubes 10, 11 and 12 and armature $a$ of the motor. Likewise control grid $11^c$ of tube 11 is connected through the parallel combination of a resistor 22 and a capacitor 23, in series with a secondary winding $24^b$ of a transformer 24, and either in series with a half-wave rectifier 25 and a secondary winding $26^b$ of a transformer 26, or in series with a resistor 27, to the aforementioned common point X. Similarly control grid $12^c$ of tube 12 is connected through the parallel combination of a resistor 28 and a capacitor 29 in series with a secondary winding $30^b$ of a transformer 30, and either in series with a half-wave rectifier 31 and a secondary winding $32^b$ of a transformer 32 or in series with a resistor 33 to common point X. Corresponding ends of primary windings $20^a$, $26^a$ and $32^a$ of transformers 20, 26 and 32 are connected to supply lines L1, L2 and L3, and the other corresponding ends of these primary windings are connected together in star. Assuming that lines L1, L2 and L3 are energized, but that no voltage is induced in the secondary windings $18^b$, $24^b$ and $30^b$ of transformers 18, 24 and 30, each of the control grids of the tubes 10, 11 and 12 will be subjected, through the medium of potentials induced in each of the secondary windings $20^b$, $26^b$ and $32^b$, and blocking action of rectifiers 19, 25 and 31, to a half-wave rectified alternating bias potential in accordance with the curve B of Fig. 2 during the first 90° of the conducting portion of the cycle of its associated main tube.

Primary winding $18^a$ of transformer 18 is connected at one end to the center tap of secondary winding $37^b$ of a transformer 37 and to the anode $38^b$ of a gaseous type pilot tube 38, and is connected at its other end in series with a resistor 39 to one end of the winding 37ᵇ. Likewise one end of primary winding 24ᵃ of transformer 24 is connected to the center tap of a secondary winding 40ᵇ of a transformer 40 and the anode 41ᵇ of a second gaseous pilot tube 41, and is connected at its other end in series with a resistor 42 to one end of winding 40ᵇ. Similarly, one end of primary winding 30ᵃ of transformer 30 is connected to the center tap of a secondary winding 43ᵇ of a transformer 43 and the anode 44ᵇ of a third gaseous pilot tube 44, and is connected at its other end in series with a resistor 45. Primary winding 37ᵃ of transformer 37 is connected at one end to supply line L1 and at its other end to supply line L3. Primary winding 40ᵃ of transformer 40 is connected at one end to the last mentioned end of winding 37ᵃ, and is connected at its other end to supply line L2. Primary winding 43ᵃ of transformer 43 is connected at one end to the last mentioned end of winding 40ᵃ of transformer 40 and supply line L2 is connected at its other end to the first mentioned end of winding 37ᵃ and to supply line L3. The other corresponding ends of secondary windings 37ᵇ, 40ᵇ and 43ᵇ of transformers, 37, 40 and 43 are connected to cathodes 38ᵃ, 41ᵃ and 44ᵃ, respectively, of pilot tubes 38, 41 and 44, and are connected with such cathodes to the aforementioned common point X.

A capacitor 46 is connected between cathode 38ᵃ and control grid 38ᶜ of tube 38, and the latter control grid is connected in series with a resistor 47 and the secondary winding 48ᵇ of a transformer 48 to the slider 49ᵃ of a potentiometer 49, and also in series with a capacitor 50 to the aforementioned common point X. Likewise a capacitor 51 is connected between cathode 41ᵃ and control grid 41ᶜ of tube 41, and the latter control grid is connected in series with a resistor 52 and the secondary 53ᵇ of a transformer 53 to slider 49ᵃ and capacitor 50. Similarly, a capacitor 54 is connected between cathode 44ᵃ and control grid 44ᶜ, and such control grid is connected in series with a resistor 55 and the secondary winding 56ᵇ of a transformer 56 to slider 49ᵃ and capacitor 50. Primary windings 48ᵃ, 53ᵃ and 56ᵃ of transformers 48, 53 and 56 are connected at corresponding ends to supply lines L1, L2 and L3, respectively, and are connected to each other in star at their other corresponding ends.

A battery 57, providing a source of unidirectional potential, is connected across resistance element 49ᵇ of potentiometer 49, and the positive terminal of such battery is connected to the mid point Z of a voltage divider, which comprises resistors 58 and 59 connected across armature $a$ of the motor. As will be understood the adjustment of tap 49ᵃ determines the base or reference unidirectional potential.

The secondary winding 48ᵇ of transformer 48 subjects control electrode 38ᶜ of pilot tube 38 to an alternating potential which varies in phase angle between the limits of the curves C and C' depicted in Fig. 3. Such alternating potential is superimposed upon a unidirectional potential which is a function of the algebraic resultant of the potential of battery 57 and the variable unidirectional potential of the mid point Z of the voltage divider connected across the motor armature $a$. Such resultant unidirectional potential is depicted, for two arbitrary values by the straight lines D and D' of Fig. 3, and as will be understood will vary in magnitude with variation of the voltage drop across the armature $a$. As is well known, the variation in magnitude of the resultant unidirectional potential causes effective variation in phase angle of the alternating potential which is superimposed thereupon in relation to the anode and critical firing potentials of tube 38. It will be apparent that the control grids 41ᶜ and 44ᶜ of pilot tubes 41 and 44 will also be subjected through the medium of the secondary windings 53ᵇ and 56ᵇ of transformers 53 and 56 to corresponding alternating potentials, that are spaced in definite phase angles with respect to each other and also to that to which control grid 38ᶜ is subjected. They are also superimposed on the same resultant unidirectional potential to which control grid 38ᶜ is subjected.

When tube 38 is nonconducting an alternating potential is superimposed on the control grid 10ᶜ of main supply tube 10, through the medium of secondary winding 18ᵇ of transformer 18, which varies in fixed phase relation to the anode potential of the tube 10, as depicted by the curve E of Fig. 2. The alternating potential of curve E is positive during the first 60° of the conducting portion of the cycle of tube 10, and, if tube 38 remains nonconductive, would be negative and remain negative during the remainder of the conducting period of tube 10. Due to the fact that the alternating potential to which control grid 10ᶜ is subjected by the secondary winding 20ᵇ of transformer (depicted by curve B of Fig. 2) is negative during the period when the alternating potential depicted by curve E is positive, tube 10 would normally be prevented from firing during the first 60° to 90° of the 240° conducting period. Now assume that tube 38 is fired sometime during the remaining 180° of the conducting period of tube 10. The firing of tube 38 causes an instantaneous phase shift of 180° in the alternating potential induced in the secondary winding 18ᵇ of transformer 18, as depicted by the vertical straight line portion between points E' and E″ on curve E of Fig. 2. As the latter potential instantaneously rises above the critical potential of tube 10 the latter is fired and conducts for the remainder of its conducting period.

It will be apparent that similar relationship exists between the firing of pilot tube 41 and its associated main supply tube 11, and also between the firing of pilot tube 44 and its associated main supply tube 12. It will also be understood that the periods, or portions of the periods of conduction will correspond in tubes 10, 11 and 12, although differing in time phase in accordance with the phase relation of the three phase alternating voltage supply source.

Successful use of my improved firing control for main supply tubes 10, 11 and 12 is not dependent upon use of the particular way of providing the variable magnitude unidirectional potential hereinbefore disclosed. The use of battery 57, potentiometer 49 and the voltage divider, comprising resistors 58 and 59, is merely illustrative of one way of deriving a control unidirectional potential which is variable with the voltage drop across a load with respect to a base or reference value. In certain applications a unidirectional control potential of fixed magnitude might be used, in which case tubes 10, 11 and 12 would always be fired at the same corresponding point in their conducting periods. Moreover, the three phase bridge rectifier circuit and firing control for the main supply tubes thereof hereinbefore described is not limited to use with the armature of a D.C. motor as a load. It may also be used with other load devices as well.

I claim:

1. The combination with a three phase source of A.C. supply, a three phase bridge rectifier circuit of the type having a controllable gaseous type main supply tube comprising an anode, cathode and control electrode and a half-wave rectifier connected in each phase of said three phase source of A.C. supply so that the anode of each gas tube is positive with respect to its cathode for two hundred forty electrical degrees, of means to prevent current conduction in each gas tube for at least the first sixty of said two hundred forty degrees and to initiate conduction at a selected time during the remaining one hundred eighty degrees comprising means to apply to the control electrode of each gas tube a half-wave rectified potential having the frequency of said supply and phased so that said control electrode is negative with respect to its cathode during substantially the first ninety of said two hundred forty degrees, means to apply to each of said control electrodes an alternating potential having the frequency of said supply and being so phased with respect to its associated cathode that each such control electrode is positive during the first sixty and is normally negative during the remaining one hundred eighty of said two hundred forty electrical degrees, and means to invert the phase of the last mentioned alternating potential one hundred eighty degrees at a selected time after the first sixty of said two hundred forty degrees.

2. The combination according to claim 1 wherein said means which apply to the control electrode of each supply tube a half-wave rectified alternating potential which is negative for the first ninety degrees of the conducting period of its associated tube each comprise a transformer and a half-wave rectifier connected in series with the secondary winding of said transformer across the control electrode-cathode circuit of said supply tube.

3. The combination according to claim 2, wherein the means which subjects the control electrode of each supply tube to an alternating potential which is positive for the sixty degrees of the conducting period of its associated supply tube, each comprise a phase shift circuit including a second transformer having a tapped secondary winding, a controllable pilot gas tube comprising an anode, cathode and control electrode having its anode cathode circuit connected across a section of said tapped secondary winding, and a third transformer having a primary winding connected across another section of the secondary winding of said second transformer and having a secondary winding connected in series with the secondary winding, the first mentioned transformer and said rectifier in the control electrode-cathode circuit of its associated supply tube.

4. The combination according to claim 3 wherein said inverting means for the last mentioned alternating potentials comprise transformers having secondary windings connected in circuit with each of the control electrodes of said pilot gas tubes to subject each of the latter control electrodes to alternating potential in phase with the respective anode potential of its associated main tube, and a source of unidirectional potential in circuit with each of the last mentioned secondary windings for controlling the effective magnitude of the last mentioned alternating potentials with respect to the control potentials of their associated pilot gas tubes.

5. The combination according to claim 4 wherein said source of unidirectional potential includes means for adjusting its magnitude.

References Cited in the file of this patent

UNITED STATES PATENTS

| | | |
|---|---|---|
| 1,893,768 | Fitzgerald | Jan. 10, 1933 |
| 2,020,961 | Quarles | Nov. 12, 1935 |
| 2,130,411 | Bedford | Sept. 20, 1938 |
| 2,141,922 | Lord | Dec. 27, 1938 |
| 2,219,397 | Plebanski | Oct. 29, 1940 |